United States Patent
Akiyama et al.

(10) Patent No.: US 8,970,090 B2
(45) Date of Patent: Mar. 3, 2015

(54) ULTRASONIC SENSOR

(75) Inventors: Keiko Akiyama, Kariya (JP); Mitsuyasu Matsuura, Chiryu (JP); Toshiki Isogai, Nagoya (JP); Makiko Sugiura, Hekinan (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 251 days.

(21) Appl. No.: 13/170,510

(22) Filed: Jun. 28, 2011

(65) Prior Publication Data
US 2011/0316388 A1 Dec. 29, 2011

(30) Foreign Application Priority Data

Jun. 29, 2010 (JP) ................................. 2010-147482

(51) Int. Cl.
H01L 41/09 (2006.01)
G01H 11/08 (2006.01)
B06B 3/00 (2006.01)
G10K 11/02 (2006.01)
G10K 13/00 (2006.01)

(52) U.S. Cl.
CPC ...... *G01H 11/08* (2013.01); *B06B 3/00* (2013.01); *G10K 11/025* (2013.01); *G10K 13/00* (2013.01)
USPC ............ 310/322; 310/327; 310/334; 310/340

(58) Field of Classification Search
USPC .......................... 310/322, 326, 327, 334, 340
See application file for complete search history.

(56) References Cited

U.S. PATENT DOCUMENTS

| 4,183,007 | A | * | 1/1980 | Baird ........................... 367/119 |
| 4,326,274 | A | * | 4/1982 | Hotta et al. ................... 367/118 |
| 4,698,541 | A | * | 10/1987 | Bar-Cohen .................... 310/326 |
| 5,481,153 | A | * | 1/1996 | Turner .......................... 310/334 |
| 8,098,000 | B2 | * | 1/2012 | Okuda et al. .................. 310/334 |
| 2004/0113522 | A1 | * | 6/2004 | Nagahara et al. ............. 310/326 |
| 2005/0236930 | A1 | * | 10/2005 | Hasegawa et al. ........... 310/322 |
| 2008/0072675 | A1 | * | 3/2008 | Okuda et al. .................... 73/627 |
| 2008/0224567 | A1 | * | 9/2008 | Sugiura et al. ................ 310/322 |
| 2009/0054784 | A1 | * | 2/2009 | Okuda et al. .................. 600/459 |

FOREIGN PATENT DOCUMENTS

JP    S56-037600 U    4/1981

OTHER PUBLICATIONS

Office Action mailed Jul. 2, 2013 in the corresponding JP application No. 2010-147482 (English translation).

* cited by examiner

*Primary Examiner* — Thomas Dougherty
(74) *Attorney, Agent, or Firm* — Posz Law Group, PLC

(57) ABSTRACT

An ultrasonic sensor is disclosed. The ultrasonic sensor includes a piezoelectric element and an acoustic matching member. The piezoelectric element is configured to detect ultrasonic wave transmitted from a transmitter and reflected by a detection target object located in a detection target space. The acoustic matching member is configured to conduct the received ultrasonic wave to the piezoelectric element. The piezo electric element is covered with the acoustic matching member including a principal oscillation portion and a supplement oscillation portion. Thickness of a part of the supplement oscillation portion, the part covering the piezoelectric element, is smaller than a predetermined thickness threshold.

2 Claims, 6 Drawing Sheets

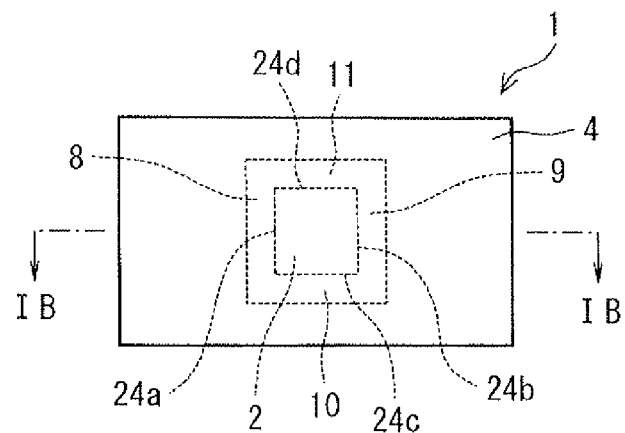
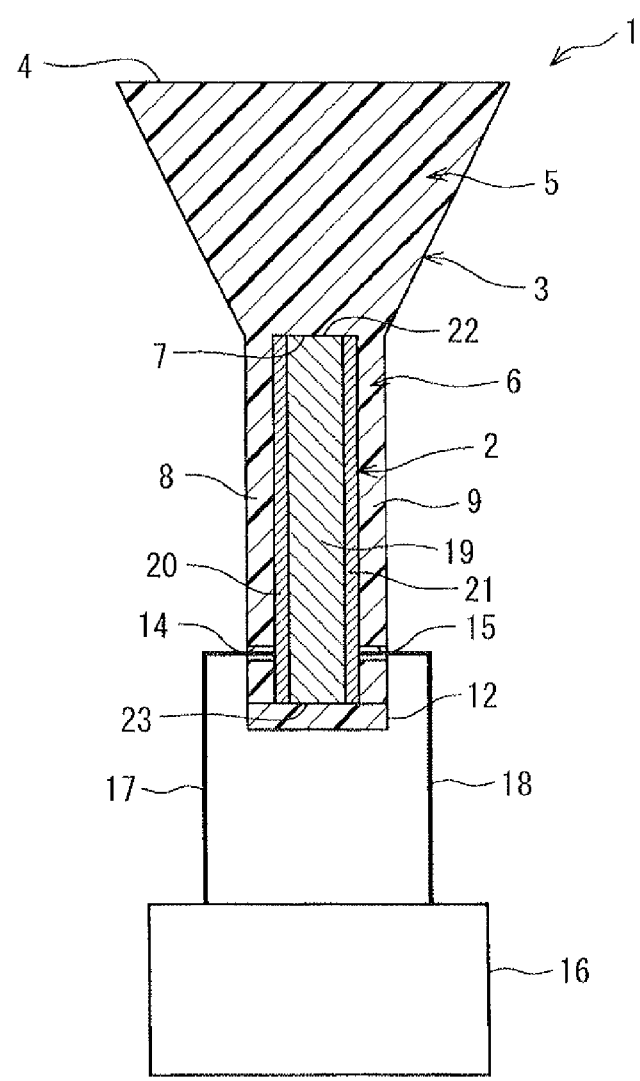

ULTRASONIC SENSOR

CROSS REFERENCE TO RELATED APPLICATION

The present application is based on and claims priority to Japanese Patent Application No. 2010-147482 filed on Jun. 29, 2010, disclosure of which is incorporated herein by reference.

BACKGROUND

1. Technical Field

The present disclosure relates to an ultrasonic sensor including a piezoelectric element for detecting ultrasonic wave and an acoustic matching member for conducting the ultrasonic wave received with an oscillation surface to the piezoelectric element.

2. Description of Related Art

Patent Document 1: JP-2009-20086A corresponding to US/20080072675A

Patent Document 2: JP-2009-49776A corresponding to US/20090054784A

Some ultrasonic sensors include a piezoelectric element and an acoustic matching member (see Patent Documents 1 and 2 for example). When the ultrasonic sensor is downsized, an oscillation surface (also called "a reception surface") for receiving the ultrasonic wave and its sound pressure may become smaller. When the oscillation surface is made smaller, a receivable sound energy becomes smaller. Thus, it is difficult to maintain ultrasonic wave detection performance while the ultrasonic sensor is being downsized. A conceivable way for addressing the above difficulty may be the following. The acoustic matching member is formed so that an area of the oscillation surface is larger than an area of a region (also called "a contact surface") contacting the piezoelectric element (see Patent Document 1 for example). In this configuration, the energy received with the oscillation surface is conducted to the contact surface, which is smaller in area than the oscillation surface. In this case, sound pressure concentration may occur and detention performance may improve. Thus, when the area of the contact surface is decreased so as to satisfy the above-described relationship between the oscillation surface and the contact surface, it is possible to maintain the ultrasonic wave detection performance while downsizing the ultrasonic sensor.

In the above related art, when the area of the oscillation surface is assumed to be constant, the ultrasonic wave detection performance improves with decreasing area of the contact surface. However, the piezoelectric element has a size limit from viewpoint of manufacturability. Thus, the above related art has a limit on the improvement of the detection performance. In addition, a decrease in the contact surface between the acoustic matching member and the piezoelectric element leads to a decrease in joint strength between the acoustic matching member and the piezoelectric element. With this regard, the above related art has a difficulty.

SUMMARY

In view of the foregoing, it is an objective of the present disclosure to provide an ultrasonic sensor that can improve ultrasonic wave detection performance without decreasing a joint strength between an acoustic matching member and a piezoelectric element while the ultrasonic sensor is being downsized as a whole.

According to an aspect of the present disclosure, an ultrasonic sensor includes a piezoelectric element, an acoustic matching member, and a circuit element. The piezoelectric element is configured to detect ultrasonic wave transmitted from a transmitter and reflected by a detection target object located in a detection target space. The acoustic matching member has an oscillations surface that is exposed to the detection target space to receive the ultrasonic wave reflected by the detection target object. The acoustic matching member is configured to conduct the ultrasonic wave received with the oscillation surface to the piezoelectric element. The circuit element is configured to perform processing on a first voltage signal outputted from the piezoelectric element. The acoustic matching member includes a principal oscillation portion and a supplement oscillation portion. The principal oscillation portion has the oscillations surface and a conduction part located opposite to each other. The conduction part is configured to conduct the ultrasonic wave received with the oscillation surface to the piezoelectric element. The supplement oscillation portion extends from the conduction part in a direction away from the oscillation surface. The piezoelectric element has a first surface facing and contacting the conduction part, and a peripheral portion disposed orthogonal to the first surface. The peripheral portion of the piezoelectric element is covered with the supplement oscillation portion of the acoustic matching member. Thickness of a part of the supplement oscillation portion, the part covering the peripheral portion of the piezoelectric element, is smaller than a predetermined thickness threshold.

According to the above ultrasonic sensor, it is possible to improve the ultrasonic wave detection performance without decreasing a joint strength between the acoustic matching member and the piezoelectric element while downsizing the ultrasonic sensor as a whole.

BRIEF DESCRIPTION OF THE DRAWINGS

The above and other objects, features and advantages of the present disclosure will become more apparent from the following detailed description made with reference to the accompanying drawings. In the drawings:

FIG. 1A is a plan view of an ultrasonic sensor of a first embodiment;

FIG. 1B is a sectional view of the ultrasonic sensor taken along line IB-IB in FIG. 1A;

DETAILED DESCRIPTION OF EMBODIMENTS (First Embodiment)

Figure 2:
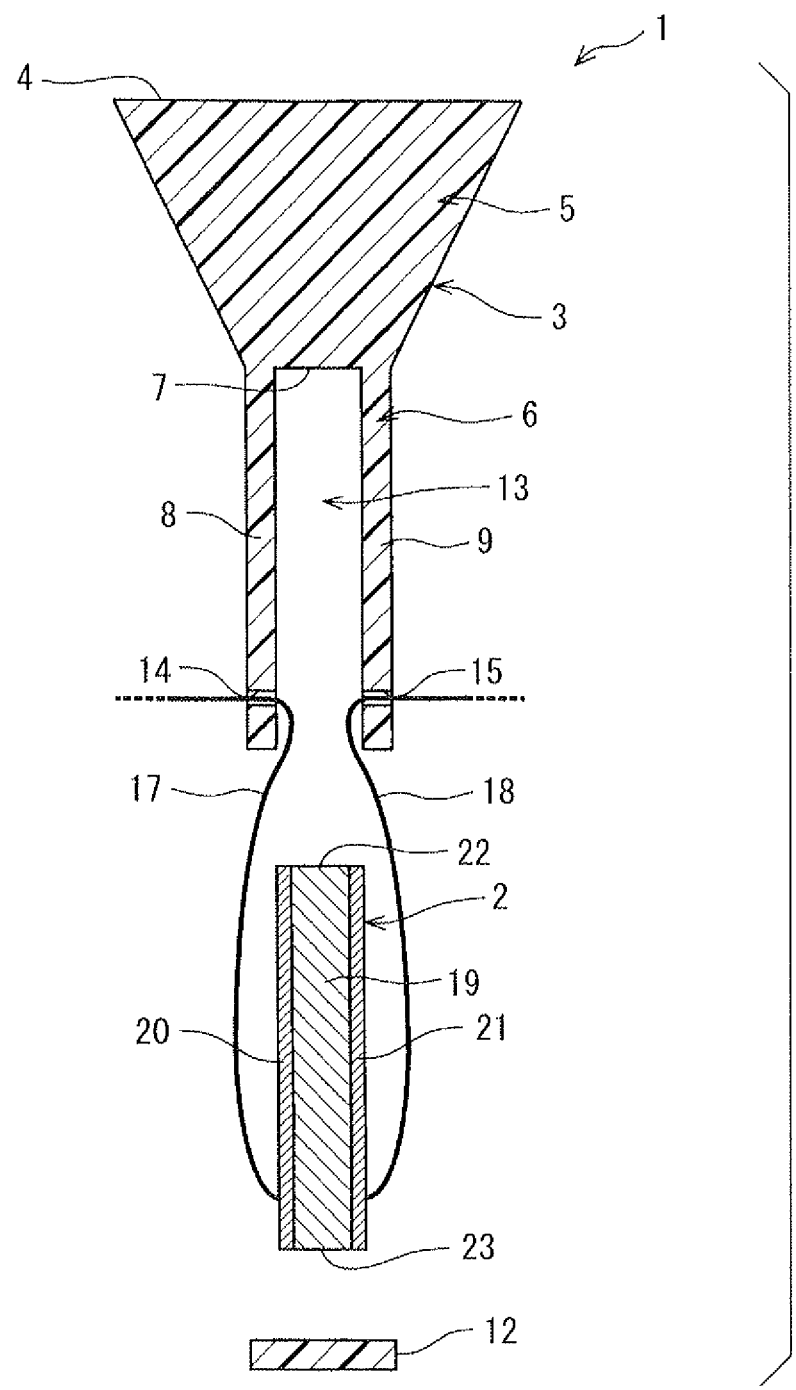
FIG. 2 is a diagram illustrating a method of assembling an ultrasonic sensor.

A first embodiment will be described with reference to FIGS. 1A to 5. FIGS. 1A and 1B illustrate a schematic structure of an ultrasonic sensor 1. The ultrasonic sensor 1 illustrated in FIGS. 1A and 1B is used for, for example, an obstacle sensor mounted to a vehicle. FIG. 1A is a plan view (top view) of the ultrasonic sensor 1 viewed from an oscillation surface. FIG. 1B is a sectional view taken along line IB-IB in FIG. 1A. In FIG. 1A, some parts are transmissively illustrated using dotted lines.

The ultrasonic sensor 1 includes a piezoelectric element 2 and an acoustic matching member 3. Although not shown in the drawings, the ultrasonic sensor 1 of the present embodiment is accommodated in a predetermined place of the vehicle. For example, the ultrasonic sensor 1 is accommodated in a case attached to a bumper of the vehicle. The ultrasonic sensor 1 may be fixed to the case so that an oscillation surface 4 of the acoustic matching member 3 is exposed to an outside of the bumper. The oscillation surface 4 of the acoustic matching member 3 receives the ultrasonic wave. The outside of the bumper is an example of a detection target space where a detection target object exists. The ultrasonic sensor 1 has a function to emit the ultrasonic wave and receive the ultrasonic wave. At reception of the ultrasonic wave, the acoustic matching member 3 receives the ultrasonic wave and conducts vibration, which results from the received ultrasonic wave, to the piezoelectric element 2. In the above, the piezoelectric element 2 operates as a receiver for receiving the ultrasonic wave and detects the ultrasonic wave (sound pressure). When the ultrasonic sensor 1 emits the ultrasonic wave, the piezoelectric element 2 operates as a transmitter for transmitting the ultrasonic wave. The ultrasonic wave produced by the piezoelectric element 2 is emitted from the oscillation surface 4 of the acoustic matching member 3.

The acoustic matching member 3 is made of a material whose acoustic impedance is larger than that of air and smaller than that of the piezoelectric element 2. Because of the above acoustic impedance, as compared with the absence of the acoustic matching member 3, the acoustic matching member 3 makes smaller a difference in acoustic impedance at a boundary surface between the ultrasonic sensor 1 and the air, and suppresses reflection of the ultrasonic wave at the boundary surface, thereby increasing the entering ultrasonic wave. For example, in the present embodiment, the acoustic matching member 3 is made of polycarbonate resin. The polycarbonate resin decreases a change in sound speed with temperature in the acoustic matching member 3. Thus, the polycarbonate resin can decrease a change in ultrasonic wave wavelength with temperature.

The acoustic matching member 3 includes a principal oscillation portion 5 and a supplement oscillation portion 6. The principal oscillation portion 5 is inverted-trapezoidal in cross section, as shown in FIG. 1B. The supplement oscillation portion 6 extends from a lower end part of the principal oscillation portion 5 in a direction away from the oscillation surface 4. An upper end surface of the principal oscillation portion 5 is the oscillation surface 4, which is illustrated at the upper part of FIG. 1B. A region of the lower end part of the principal oscillation portion 5, which region is in contact with the piezoelectric element 2, is a contact surface 7. The oscillation surface 4 and the contact surface 7 are located opposite to each other. The lower end part of the principal oscillation portion 5 can correspond to a conduction part of a principal oscillation portion.

The oscillation surface 4 has, for example, a rectangular shape with 4.3 mm×10.5 mm. The contact surface 7 has, for example, a rectangular shape with 1.5 mm×1.5 mm. In this way, the principal oscillation portion 5 is formed so that an area of the oscillation surface 4 is larger than that of the contact surface 7 contacting the piezoelectric element 2.

The supplement oscillation portion 6 include multiple wall parts 8 to 11 and a bottom surface plate 12. Each of the multiple wall parts 8 to 11 has a rectangular plate shape. The multiple wall parts 8 to 11 extend from a region, which is other than the contact surface, of the lower end part of the principal oscillation portion 5 in a direction away from the oscillation surface 4 (see a lower direction in FIG. 1B). Because of the above structure, the contact surface 7 of the principal oscillation portion 5 and the multiple wall parts 8 to 11 of the supplement oscillation portion 6 define an space 13 (see FIG. 2) for insertion of the piezoelectric element 2. In the space 13, the piezoelectric element 2 is located. The multiple wall parts 8 to 11 can correspond to a first wall part, a second wall part, a third wall part and a fourth wall part, respectively.

The bottom surface plate 12 has a rectangular plate shape whose size is the substantially same as the size of the cross section of the lower end part of the principal oscillation portion 5. The bottom surface plate 12 is located to cover an open end of the space 13. The open end of the space 13 is located at a lower end of the space 13 in the example illustrated in FIG. 1B. Grooves 14, 15 are formed on the wall parts 8, 9, respectively. Each groove 14, 15 is located at a distant side end region of the corresponding wall part 8, 9, The distant side end region is one of opposite end regions of the wall part that is located distant from the principal oscillation portion 5 as compared with the other of the opposite end regions of the wall part 8, 9. In FIG. 1B, the groove 14, 15 is located at a lower end region of the wall part 8, 9. The grooves 14, 15 are provided to form passages for signal lines 17, 18. The signal lines 17, 18 conduct a voltage signal, which is outputted from the piezoelectric element 2, to a circuit element 16.

The oscillation surface 4 of the acoustic matching member 3 receives the ultrasonic wave that has been produced by the piezoelectric element 2, conducted to the acoustic matching member 3, emitted toward the front of the vehicle, and reflected at an obstacle exiting in front of the vehicle. The acoustic matching member 3 conducts the ultrasonic wave received with the oscillation surface 4 to the piezoelectric element 2. Specifically, the received ultrasonic sensor wave is conducted to the piezoelectric element 2 through the contact surface 7, the wall parts 8 to 11 and the bottom surface plate 12. In the above, the obstacle can correspond to a detection target object in a detection target space.

The piezoelectric element 2 includes a piezoelectric body 19 and a pair of electrodes 20, 21. The piezoelectric body 19 has a four-sided prism shape. The electrodes 20, 21 are respectively located on side surfaces of the piezoelectric body 19, so that the piezoelectric body 19 is sandwiched between the pair of electrodes 20, 21. In FIG. 1B, the electrodes 20, 21 are located on a left side surface and a right side surface of the piezoelectric body 19, respectively. The piezoelectric body 19 is made of, for example, PZT (lead zirconate titanate). In this case, since PZT has a large piezoelectric constant, it becomes possible to receive the ultrasonic wave with small sound pressure, and it becomes possible to achieve high ultrasonic wave detection sensitivity. The electrodes 20, 21 may be formed by sputtering Pt, Cu etc., plating, baking an electrically-conductive paste, or the like.

An upper surface 22 of the piezoelectric element 2 is in contact with the contact surface 7 of the principal oscillation portion 5. A lower surface 23 of the piezoelectric element 2 is in contact with the bottom surface plate 12 of the supplement oscillation portion 6. Four side surfaces 24a to 24d of the piezoelectric element 2 is in contact with the wall parts 8 to 11 of the supplement oscillation portion 6. That is, the piezoelectric element 2 is covered with the acoustic matching member 3 including the principal oscillation portion 5 and the supplement oscillation portion 6. In the above, the upper surface 22 and the lower surface 23 of the piezoelectric element 2 can correspond to a first surface and a second surface of a piezoelectric element, respectively. The four side surfaces 24a to 24d of the piezoelectric element 2 can correspond to a peripheral portion of a piezoelectric element.

Thickness of a part of the supplement oscillation portion 6, the part covering the piezoelectric element 2, is smaller than a predetermined thickness threshold. That is, thicknesses of the wall parts 8 to 11 and the bottom surface plate 12 are smaller than the predetermined thickness threshold. The predetermined thickness threshold is set so as to satisfy the following condition. Specifically, the threshold is set so that mass m1 of the principal oscillation portion 5, mass m2 of the supplement oscillation portion 6 and mass m3 of the piezoelectric element 2 satisfy the following relation:

$$m2 \leq m1 + m3. \tag{1}$$

In other words, the predetermined thickness threshold is set so that the mass m2 of the supplement oscillation portion 6 is less than or equal to mass threshold m1+m3, which is the sum of mass m1 of the principal oscillation portion 5 and mass m3 of the piezoelectric element 2. In the present embodiment, the thickness threshold is set to, for example, 1 mm. As long as the masses m1, m2 and m3 satisfy the above relation (1), the thickness threshold can be appropriately changed in consideration of the shape or mass of the piezoelectric element 2 and the acoustic matching member 3.

When the piezoelectric element 2 operates as the receiver, the piezoelectric element 2 oscillates in response to the ultrasonic wave conducted from the acoustic matching member 3, and generates a voltage signal (also called "a first voltage signal") that depends on the vibration. The voltage signal outputted from the electrodes 20, 21 of the piezoelectric element 2 is given to the circuit element 16 via the signal lines 17, 18. The circuit element 16 is electrically connected to an electric control unit (ECU, not shown in the drawings). The circuit element 16 performs a computation process based on the voltage signal given from the piezoelectric element 2, and outputs a signal indicating a result of the computation process to the ECU. Because of the above configuration, the circuit element 16 and the ECU can, for example, measure a distance to the obstacle by obtaining a period of time from transmission of the ultrasonic wave to reception of the ultrasonic wave.

When the piezoelectric element operates as a transmitter, the circuit element 16 outputs a voltage signal (also called "a second voltage signal"), which controls the ultrasonic wave to be transmitted, to the piezoelectric element 2 based on a control signal outputted from the ECU. Accordingly, the piezoelectric element 2 oscillates due to the voltage signal, and produces the ultrasonic wave with a given sound pressure and a given phase. The acoustic matching member 3 emits the ultrasonic wave, which is produced by the piezoelectric element 2, from the oscillation surface 4 toward an outside of the vehicle.

Next, a manufacturing method of the ultrasonic sensor 1 will be described with reference to FIG. 2. The principal oscillation portion 5 and the wall parts 8 to 11 of the supplement oscillation portion 6 of the acoustic matching member 3 are formed as a first single piece member by, for example, injection molding. The bottom surface plate 12 of the supplement oscillation portion 6 is formed as a second single piece member by, for example, injection molding. The first single piece member and the second single piece member are provided separately from each other. One end of each signal line 17, 18 is connected to the corresponding electrode 20, 21 of the piezoelectric element 2 by, for example, soldering (not shown).

In the present embodiment, with use of the above members, the ultrasonic sensor 1 is assembled in the following way. FIG. 2 is a diagram illustrating a method of assembling the ultrasonic sensor 1. As show in FIG. 2, the other end of the signal line 17 is taken from the space 13 to an outside via the groove 14. The other end of the signal line 18 is taken from the space 13 to an outside via the groove 15. In this way, while the signal lines 17, 18 are being pull out, the piezoelectric element 2 is received in the space 13 of the acoustic matching member 3. In the above, an adhesive (also called "an adhesive material) is applied to the contact surface 7 and surfaces of the wall parts 8 to 11 facing the space 13. The adhesive is further applied to an upper surface of the bottom surface plate 12. The bottom surface plate 12 with the adhesive is attached so as to cover the open end of the space 13. Note that the open end is located at the lower end of the space 13 in FIG. 2. Although not shown in the drawings, the other end of each signal line 17, 18 is connected to the circuit element 16.

Figure 3:
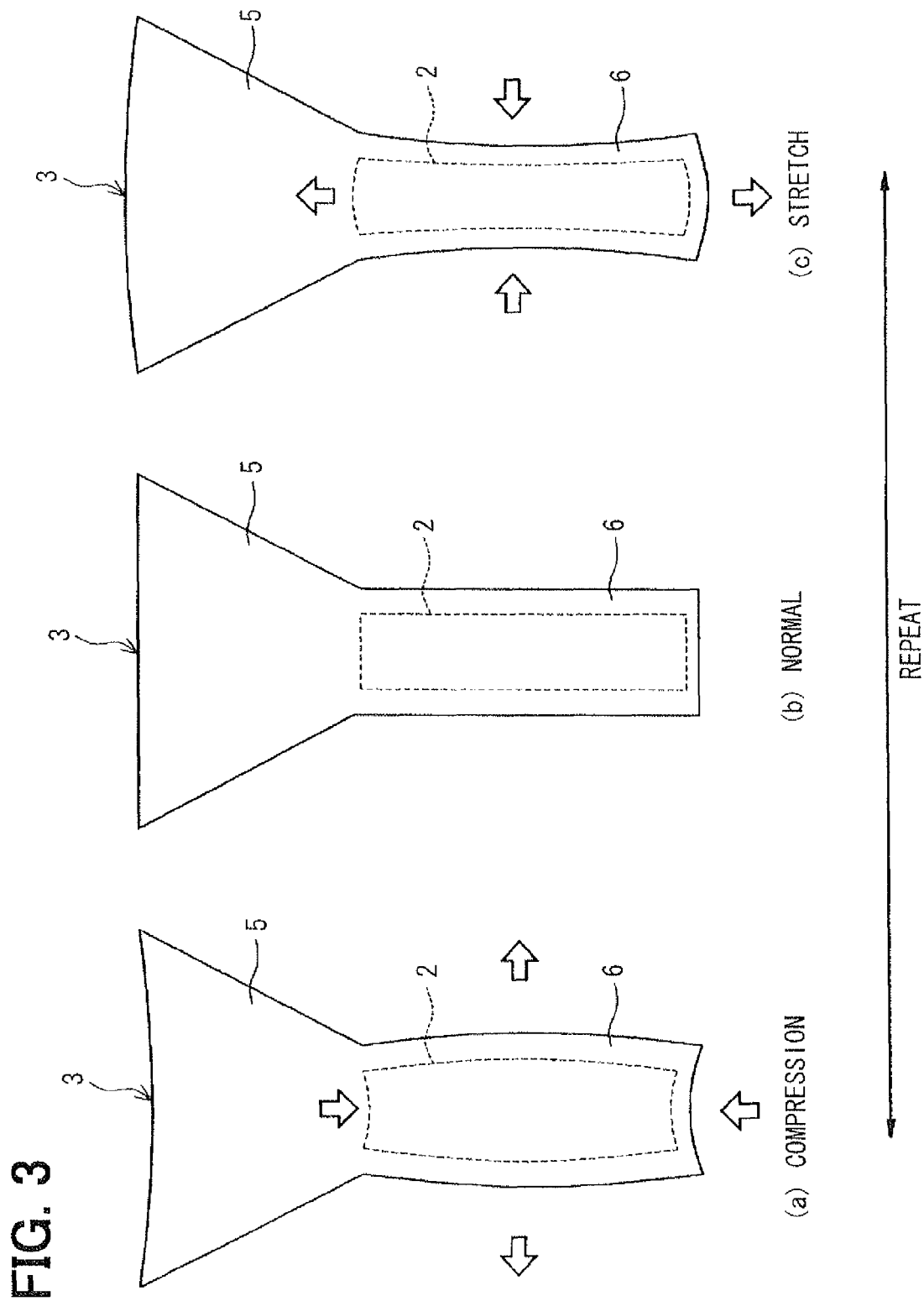
FIG. 3 is a diagram illustrating operation of an ultrasonic sensor at a time of ultrasonic wave detection.

Operations and advantages of the above ultrasonic sensor 1 will be described with reference to FIGS. 3 to 5. FIG. 3 schematically illustrates operation of the ultrasonic sensor 1 at ultrasonic wave reception. In FIG. 3, the left hand side shows (a) a compression state. The center shows (b) a normal state. The right hand side shows (c) a stretch state. The ultrasonic wave received with the oscillation surface 4 of the acoustic matching member 3 is conducted to the piezoelectric element 2 in the following way.

Specifically, when the oscillation surface 4 of the acoustic matching member 3 receives the ultrasonic wave, vibration (force) caused by the ultrasonic wave is conducted to the upper surface of the piezoelectric element 2 via the contact surface 7 and is also conducted to the lower surface 23 and the side surfaces 24a to 24d of the piezoelectric element 2 via the supplement oscillation portion 6. The piezoelectric element 2 oscillates in response to the vibration conducted to the lower surface 23 and the side surfaces 24a to 24d in addition to the vibration conducted to the upper surface 22.

More specifically, as shown by the compression state (a) in FIG. 3, when the piezoelectric element 2 is compressed in a principal direction (see, a upper-to-lower direction in FIG. 3) normal to the upper surface 22 due to the vibration conducted to the upper surface 22, the piezoelectric element 2 is stretched in a supplement direction (see a left-to-right direction in FIG. 3) perpendicular to the principal direction due to the vibration conducted to the side surfaces 24a to 24d. In the above, a stretch motion of the piezoelectric element 2 in the supplement direction takes place so as to assist a compression motion in the principal direction. Furthermore, the vibration conducted to the lower surface 23 causes a force that also compress the piezoelectric element 2 in the principal direction.

As shown by the stretch state (c) in FIG. 3, when the piezoelectric element 2 is stretched in the principal direction due to the vibration conducted to the upper surface 22, the piezoelectric element 2 is compressed in the supplement direction due to the vibration conducted to the side surfaces 24a to 24d. That is, a compression motion in the supplement direction takes place so as to assist a stretch motion in the principal direction. Furthermore, the vibration conducted to the lower surface 23 causes a force that also stretches the piezoelectric element 2 in the principal direction.

As shown by the normal state (b) in FIG. 3, the piezoelectric element 2 between the compression state (a) and the stretch state (c) has a normal state (b), which is the substantially same state as when the ultrasonic wave is not being received. As can be seen from the above, when the ultrasonic wave is received with the oscillation surface 4 of the acoustic matching member 3, the piezoelectric element 2 transits from the compression state (a) to the stretch state (c) via the normal state (b). Then, the piezoelectric element 2 transits from the stretch state (c) to the compression state (a) via the normal state, as shown in FIG. 3. In the piezoelectric element 2, these transitions are repeated. In this way, the piezoelectric element 2 repeats oscillations, and generates the oscillation-dependent voltage signal because of piezoelectric effect. It should be noted that the piezoelectric element 2 at ultrasonic wave transmission oscillates in response to the applied voltage signal in the substantially same manner as that at the ultrasonic wave reception because of inverse piezoelectric effect.

As described above, the ultrasonic sensor 1 of the present embodiment is configured such that the piezoelectric element 2 is covered with the acoustic matching member 3 including the principal oscillation portion 5 and the supplement oscillation portion 6. Because of this configuration, when the ultrasonic wave is received with the oscillation surface 4 of the acoustic matching member 3, the vibration depending on the received ultrasonic wave is conducted to the upper surface 22 of the piezoelectric element 2 via the contact surface 7 and is also conducted to the lower surface 23 and the side surfaces 24a to 24d of the piezoelectric element 2 via the supplement oscillation portion 6. Thus, magnitude of oscillation (i.e., deformation amount of the piezoelectric element 2) increases as compared with a case where the vibration is conducted only from the upper surface 22. Accordingly, level of the voltage signal outputted from the piezoelectric element 2 increases. As a result, it is possible to improve the ultrasonic wave detection sensitivity. Furthermore, at the ultrasonic wave transmission, the ultrasonic wave produced by the piezoelectric element 2 is conducted not only via the contact surface 7 of the acoustic matching member 3 but also via the supplement oscillation portion 6. Thus, it is possible to improve ultrasonic wave transmission performance in the substantially same manner as that at the ultrasonic wave reception. Therefore, the ultrasonic sensor 1 of the present embodiment can improve ultrasonic wave detection performance including transmission performance and reception performance.

In this regard, however, since the supplement oscillation portion 6 covers the piezoelectric element 2, there is a possibility that the supplement oscillation portion 6 constrains the oscillation, which is caused by the ultrasonic wave, of the piezoelectric element 2. Therefore, in order to obtain the advantage of improvement of ultrasonic wave detection performance, the effect on the assistance of oscillation needs to be stronger than the effect on the constraint of oscillation. The effect of the supplement oscillation portion 6 on the constraint of oscillation of the piezoelectric element 2 is proportional to the mass m2 of the supplement oscillation portion 6, according to equation of motion. The inventors of the present application have conducted experiments, simulations and the like, and have discovered that, when the mass m2 of the supplement oscillation portion 6 is less than or equivalent to the sum m1+m3 of the mass m1 of the principal oscillation portion 5 and the mass m3 of the piezoelectric element 2, it is possible to achieve the above described advantage of improvement of the ultrasonic wave detection performance. Because of this, the thicknesses of the wall parts 8 to 11 and the bottom surface plate 12 of the supplement oscillation portion 6 are set so as to satisfy the above-described relation (1). For example, in the present embodiment, thicknesses of the wall parts 8 to 11 and the bottom surface plate 12 are set to 1 mm. In this case, the above-described advantage of improvement of the ultrasonic wave detection performance is reliably and surely achievable.

Figure 4:
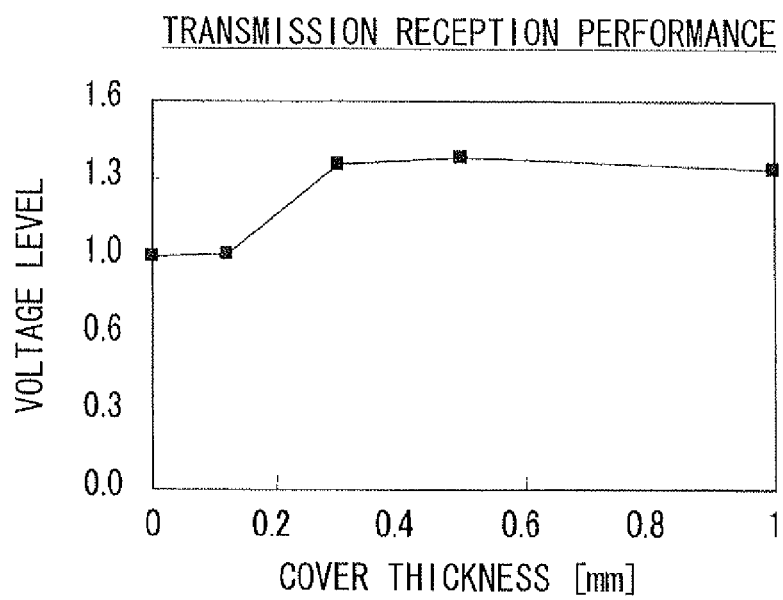
FIG. 4 is a diagram illustrating a relationship between cover thickness and voltage level generated by a piezoelectric element.

FIG. 4 illustrates a relationship between voltage level of the voltage signal generated by the piezoelectric element 2 and cover thickness. The cover thickness is thickness of the part of the supplement oscillation portion 6 covering the piezoelectric element 2. That is, the cover thickness is the thickness of the wall part 8 to 11 and the bottom surface plate 12. In FIG. 4, the vertical axis shows a ratio of the voltage level to a reference voltage level that corresponds to the cover thickness of zero (0 mm).

As shown in FIG. 4, from the cover thickness of approximately 0.2 mm or less, the voltage level increases with increasing cover thickness. At the cover thickness of approximately 0.3 mm or less, the voltage level exceeds 1.3. At the cover thickness of approximately 0.5 mm, the voltage level has maximum of approximately 1.4. Between the cover thickness of 0.5 mm and that of 1 mm, although the voltage level decreases with increasing cover thickness, the voltage level is greater than or equal to 1.3. As can be seen from the above, the voltage level is generally greater than or equal to 1.3 between the cover thickness of 0.3 mm and that of 1 mm. That is, the voltage level of the voltage signal generated by the piezoelectric element 2 is 1.3 times or more as that in the case of the cover thickness of zero (i.e., in a case of a related art). The increase in the voltage level means the improvement of the ultrasonic wave detection performance including the transmission performance and the reception performance. It should note that, although not shown in the drawings, when the cover thickness exceeds 1 mm, the voltage level of the voltage signal further decreases. Thus, by setting the cover thickness less than or equal to 1 mm, it is possible to reliably and surely achieve the advantage of improvement of the ultrasonic wave detection performance.

Moreover, since the upper surface 22 and the side surfaces 24a to 24d of the piezoelectric element 2 are covered with the single piece member having the principal oscillation portion 5 and the wall parts 8 to 11, it is possible to increase a joint strength between the piezoelectric element 2 and the acoustic matching member 3. FIG. 5 illustrates a result of a tensile test that was performed in a state where the ultrasonic sensor 1 was assembled. In FIG. 5, a relationship between tensile strength (i.e., joint strength) and cover thickness is shown. In the tensile test, a force (a tensile load) was applied to both of an upper region of the principal oscillation portion 5 and a lower region of the supplement oscillation region 6, and it was investigated what magnitude of the force leads to a separation of the acoustic matching member 3 and the piezoelectric element 2 from each other due to breakage of the adhesion (bonding).

Figure 5:
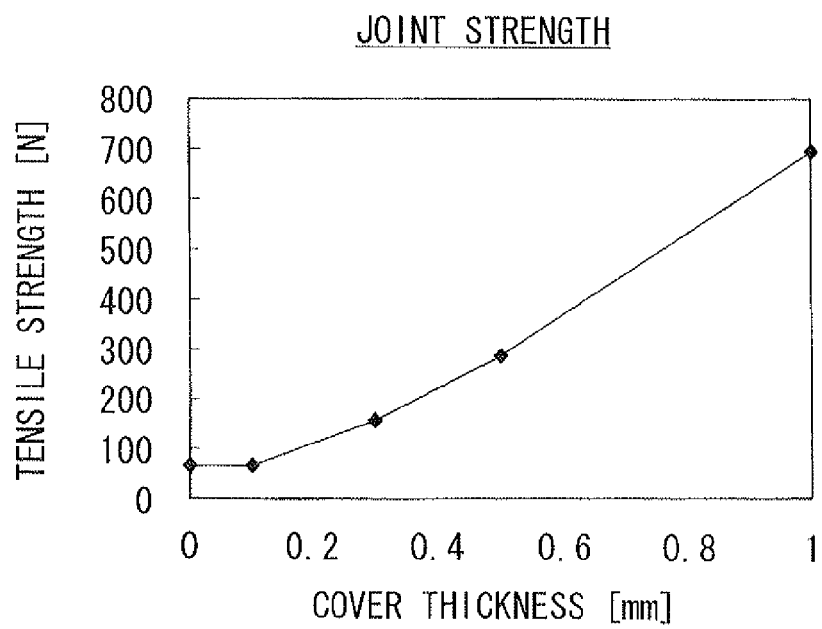
FIG. 5 is a diagram illustrating a relationship between cover thickness and tensile strength.

As shown in FIG. 5, the tensile strength increases approximately in proportion to the cover thickness. In other words, the bonding strength increases with increasing thickness of the wall parts 8 to 11 of the acoustic matching member 3. However, as described above, since the cover thickness influences the ultrasonic wave detection performance, the cover thickness is set to 1 mm in the present embodiment. When the cover thickness is set to 1 mm, the bonding strength is largely enhanced as compared with the cover thickness of zero (in the case of a related art), as shown in FIG. 5. As shown in FIG. 5, the bonding strength increases from approximately 70 [N] to approximately 700 [N]. According to the ultrasonic sensor 1 of the present embodiment, even when the area of the contact surface 7 is made smaller in order to downsize the ultrasonic sensor 1, it is possible to provide a superior advantage of enhancement of ultrasonic detection performance without involving a decrease in bonding strength between the acoustic matching member 3 and the piezoelectric element 2.

It may be necessary to set the thicknesses of the wall parts 8 to 11 to values that satisfy the above-described relation (1). It may be necessary to set a molding pressure to a higher value in order to make the wall parts 8 to 11 thin to some extents. However, the piezoelectric element 2 has a given limit on withstanding pressure. Thus, if the acoustic matching member 3 and the piezoelectric element 2 are integral-molded, it may be necessary to set the molding pressure so as to satisfy (i) a first condition that the thicknesses of the wall parts 8 to 11 are less than or equal to the thickness threshold and (ii) a second condition that the molding pressure is less than or equal to the withstanding pressure of the piezoelectric element 2. In the above case, the setting of the molding pressure is quite complicated. In addition, depending on the above first and second condition, the manufacturing may become impossible.

The present embodiment can address the above difficulty. In the present embodiment, the acoustic matching member 3 and the piezoelectric element 2 are not integral-molded but formed as different members provided separately from each other, and then the acoustic matching member 3 and the piezoelectric element 2 are bonded to each other by the adhesive. Since the acoustic matching member 3 is molded and formed as a member separately from the piezoelectric element 2 having a limit on the withstanding pressure, it is possible to form, by molding, the wall parts 8 to 11 to a desired thickness with no constraint of the withstanding pressure of the piezoelectric element 2.

In the acoustic matching member 3, the contact surface 7 of the principal oscillation portion 5 and the wall parts 8 to 11 of the supplement oscillation portion 6 define the space 13 for insertion of the piezoelectric element 2. Thus, it is possible to cover the peripheral portion of the piezoelectric element 2 with the supplement oscillation portion 6 by only performing, in manufacturing steps, a process of inserting the piezoelectric element 2 into the space 13 after manufacturing the acoustic matching member 3 and the piezoelectric element 2 separately from each other.

In the supplement oscillation portion 6, the grooves 14, 15 for wiring are formed on the lower end regions of the wall parts 8, 9. Because of this, with the side surfaces 24a to 24d of the piezoelectric element 2 being kept covered with the wall parts 8 to 11, it is possible to wire the ultrasonic sensor 1 by using the signal lines 17, 18, which conducts the voltage signal between the piezoelectric element 2 and the circuit element 16.

The acoustic matching member 3 is formed so that the oscillation surface 4 is larger in area than the contact surface 7 contacting the upper surface 22 of the piezoelectric element 2. According this configuration, the energy of the ultrasonic wave received with the oscillation surface 4 is conducted via a region smaller in area than the oscillation surface 4. Therefore, it is possible to increase the energy per unit area and it is possible to improve efficiency in conduction of the ultrasonic wave.

The acoustic matching member 3 is made of polycarbonate resin. In the polycarbonate resin, a change in elasticity with temperature is small. As a result, a change in sound speed with temperature is small, and the change in ultrasonic wavelength with temperature is small in the acoustic matching member 3. Thus, it is possible to achieve an advantage of stable conduction of the vibration.

The piezoelectric element 2 is configured to be operable as not only the receiver for receiving the ultrasonic wave but also as the transmitter for transmitting the ultrasonic save. Therefore, an additional transmitter for transmitting the ultrasonic wave may not be needed, and the ultrasonic sensor 1 can be downsized.

(Second Embodiment)

Figure 6A:
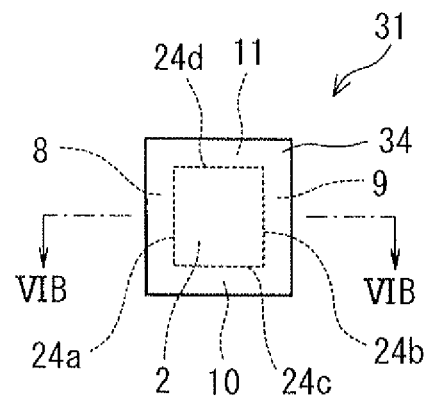
FIG. 6A is a plan view of an ultrasonic sensor of a second embodiment.
Figure 6B:
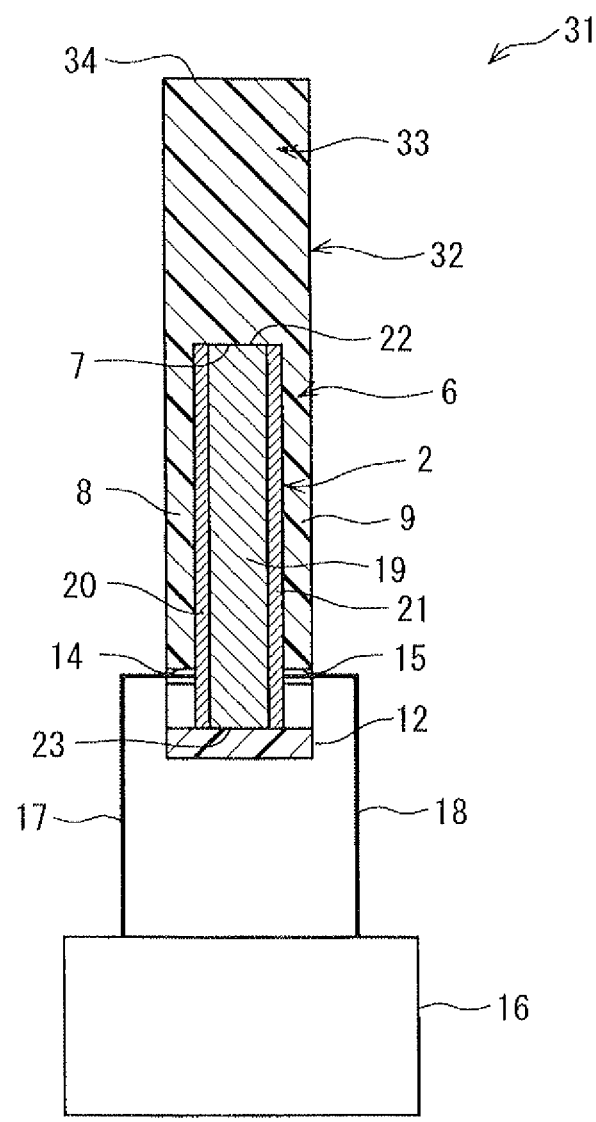
FIG. 6B is a sectional view of the ultrasonic sensor taken along line VIB-VIB in FIG. 6A.

A second embodiment will be described with reference to FIGS. 6A and 6B. The second embodiment can be a modification of the first embodiment. For example, a configuration of the principal oscillation portion of the acoustic matching member is modified. FIG. 6A is a plan view (top view) of an ultrasonic sensor 31 of the second embodiment viewed from an oscillation surface. FIG. 6B is a sectional view taken along line VIB-VIB in FIG. 6A. The ultrasonic sensor 31 illustrated in FIGS. 6A and 6B is different from the ultrasonic sensor 1 illustrated in FIGS. 1A and 1B in that the ultrasonic sensor 31 includes an acoustic matching member 32 in place of the acoustic matching member 3.

The acoustic matching member 32 includes a principal oscillation portion 33 and the supplement oscillation portion 6. The principal oscillation portion 33 is rectangular in cross section, as shown in FIG. 6B. An upper end surface of the principal oscillation portion 33 is an oscillation surface 34 and is illustrated at an upper part in FIG. 6B. A lower end part (see a lower part in FIG. 6B) of the principal oscillation portion 33 has a region contacting the piezoelectric element 2. The region contacting the piezoelectric element 2 is the contact surface 7. The oscillation surface 34 has, for example, a rectangular shape with 2 mm×2 mm.

In the ultrasonic sensor 31 of the present embodiment, a difference in area between the oscillation surface 34 and the contact surface 7 is small as compared with the first embodiment. An advantage of improvement of the efficiency in conduction of the ultrasonic wave (i.e., the advantage of improvement of the ultrasonic wave detection performance) may become slightly smaller in the present embodiment; however, the present embodiment can have the substantially same operating manners and the substantially same advantages as the first embodiment. More specifically, regardless of the shape of the principal oscillation portion of the acoustic matching member, the substantially same operating manners and the substantially same advantages as those in the first embodiment are achievable as long as the lower surface 23 and the side surfaces 24a to 24d of the piezoelectric element 2 are covered with the supplement oscillation portion 6.

(Third Embodiment)

Figure 7A:
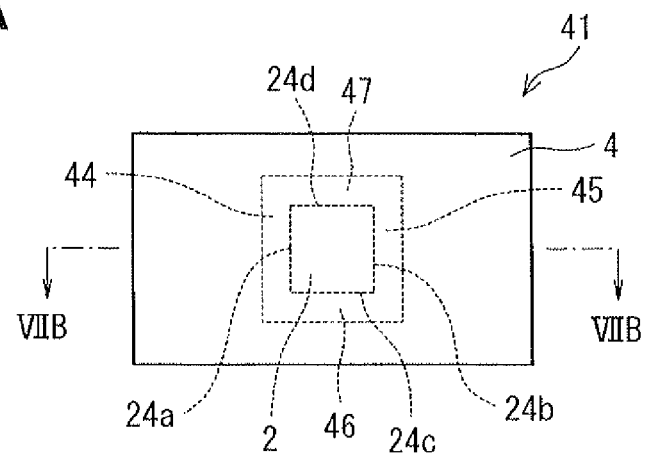
FIG. 7A is a plan view of the ultrasonic sensor of a third embodiment.
Figure 7B:
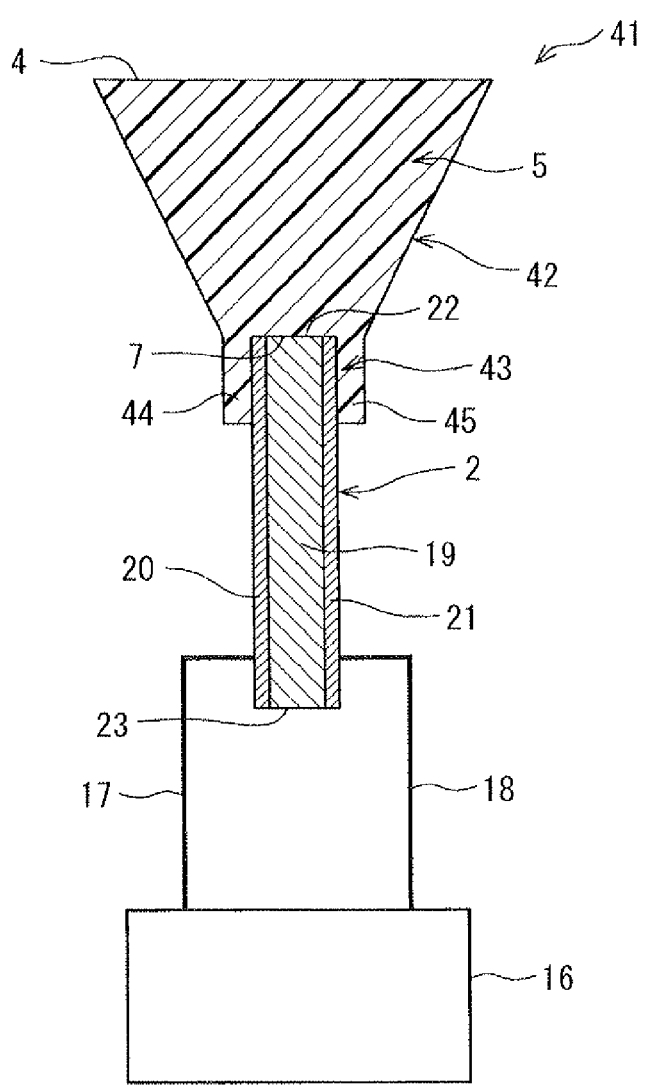
FIG. 7B is a sectional view if the ultrasonic sensor taken along line VIIB-VIIB in FIG. 7A.

A second embodiment will be described with reference to FIGS. 7A and 7B. The second embodiment can be a modification of the first embodiment. For example, a configuration of the supplement oscillation portion of the acoustic matching member is modified. FIG. 7A is a plan view (top view) of an ultrasonic sensor 41 of the third embodiment viewed from an oscillation surface. FIG. 7B is a sectional view taken along line VIIB-VIIB in FIG. 7A. The ultrasonic sensor 41 illustrated in FIGS. 7A and 7B is different from the ultrasonic sensor 1 illustrated in FIGS. 1 and 1B in that the ultrasonic sensor 41 includes an acoustic matching member 42 in place of the acoustic matching member 3.

The acoustic matching member 42 includes the principal oscillation portion 5 and a supplement oscillation portion 43. The supplement oscillation portion 43 includes multiple wall parts 44 to 47. Each of the multiple wall parts 44 to 47 has a rectangular plate shape. The multiple wall parts 44 to 47 extend from a region, which is other than the contact surface 7, of the lower end part of the principal oscillation portion 5 in a lower direction, as shown in FIG. 7B. Length of each wall part 44 to 47 along the lower direction (see the upper-to-lower direction in FIG. 7B) is smaller than that of each wall part 8 to 11 of the first embodiment (see FIG. 1B). Because of this structure, the contact surface 7 of the principal oscillation portion 5 and the wall parts 44 to 47 of the supplement oscillation portion 43 define a space for insertion of an upper portion of the piezoelectric element 2, so that the space receives the upper portion of the piezoelectric element 2. The multiple wall parts 44 to 47 can correspond to a first wall part, a second wall part, a third wall part and a fourth wall part, respectively.

The upper surface 22 of the piezoelectric element 2 is in contact with the contact surface 7 of the principal oscillation portion 5. Upper portions of the four side surfaces 24a to 24d of the piezoelectric element 2 are in contact with the wall parts 44 to 47 of the supplement oscillation portion 43, respectively. More specially, only the upper portion of the piezoelectric element 2 is covered with the acoustic matching member 42 including the principal oscillation portion 5 and the supplement oscillation portion 43. In other words, a part of the peripheral portion of the piezoelectric element is exposed from the supplement oscillation portion.

In the ultrasonic sensor 41 of the present embodiment, a portion of the piezoelectric element 2 covered with the supplement oscillation portion 43 of the acoustic matching member 42 is smaller as compared with the first embodiment. The advantage of conduction of the vibration in the supplement oscillation portion 43 (i.e., the advantage of improvement of the ultrasonic wave detection performance) may become slightly smaller; however, the present embodiment can have the substantially same operating manners and the substantially same advantages as the first embodiment. More specifically, the substantially same operating manners and the substantially same advantages as those in the first embodiment are achievable as long as at a least portion of the side surfaces 24a to 24d of the piezoelectric element 2 is covered with the supplement oscillation portion of the acoustic matching member.

(Other Embodiments)

Embodiments of the present invention are not limited to those described above and described in the drawings. The above embodiments can be modified or extended in various ways, examples of which will be described below. The piezoelectric element 2 may be used as an element only for receiving the ultrasonic wave. Alternatively, the piezoelectric element 2 may be used as an element only for transmitting the ultrasonic wave. When multiple elements are used, a specific element may be used as the transmitter, so that a circuit for transmission and a circuit for reception are dividable. In this case, it is possible to achieve an advantage of simplification of a circuit configuration. Moreover, when the transmission and the reception are divided, the receiver is not influenced by reverberation created at the time of transmission.

The principal oscillation portion 5 illustrated in FIG. 1B is trapezoidal in cross section. However, the cross section is not limited to a trapezoid. For example, the cross section of the principal oscillation portion 5 has such a cross section that a portion corresponding to a non-parallel side of the trapezoid is curved. Alternatively, the principal oscillation portion 5 is rectangular in cross section. Alternatively, the principal oscillation portion 5 may have a circular cylindrical shape.

In the first embodiment and the second embodiment, the bottom surface plate 12 may be omitted in cases where a problem of ultrasonic wave detection performance, environment resistance performance and impact resistance performance is not brought out.

Positions of the grooves 14, 15 on the wall parts 8, 9 are changeable on an as-needed basis. As long as the wiring for the circuit element 16 by using the signal lines 17, 18 is possible, a configuration for wiring is not limited to using the grooves 14, 15.

In the above embodiments, the ultrasonic sensor is used for an obstacle sensor mounted to a vehicle. Alternatively, the ultrasonic sensor can be used for various sensors. For example, the ultrasonic sensor can be used for an air flow meter for exhaust gas, which is mounted to a vehicle. Furthermore, application of the ultrasonic sensor is not limited to an in-vehicle application. For example, the ultrasonic sensor can be used for a sensor mounted to a robot, such a clearance sonar, a sensor for fall-prevention and the like. Furthermore, the ultrasonic sensor can be used for a human sensing sensor (sensor for sensing human presence) mounted to an air conditioner, a television apparatus or the like.

According to an example of the present disclosure, an ultrasonic sensor may be configured in the following way. The ultrasonic sensor includes a piezoelectric element, an acoustic matching member, and a circuit element. The piezoelectric element is configured to detect ultrasonic wave transmitted from a transmitter and reflected by a detection target object located in a detection target space. The acoustic matching member has an oscillations surface that is exposed to the detection target space to receive the ultrasonic wave reflected by the detection target object. The acoustic matching member is configured to conduct the ultrasonic wave received with the oscillation surface to the piezoelectric element. The circuit element is configured to perform processing on a first voltage signal outputted from the piezoelectric element. The acoustic matching member includes a principal oscillation portion and a supplement oscillation portion. The principal oscillation portion has the oscillations surface and a conduction part located opposite to each other. The conduction part is configured to conduct the ultrasonic wave received with the oscillation surface to the piezoelectric element. The supplement oscillation portion extends from the conduction part in a direction away from the oscillation surface. The piezoelectric element has a first surface facing and contacting the conduction part, and a peripheral portion disposed orthogonal to the first surface. The peripheral portion of the piezoelectric element is covered with the supplement oscillation portion of the acoustic matching member. Thickness of a part of the supplement oscillation portion, the part covering the peripheral portion of the piezoelectric element, is smaller than a predetermined thickness threshold.

According the above ultrasonic sensor, the piezoelectric element can oscillate in response to the vibration applied from the conduction part to the first surface of the piezoelectric element. In other words, the piezoelectric element can oscillate in response to the ultrasonic wave (sound pressure) received with the oscillation surface. Because of piezoelectric effect, the piezoelectric element generates the first voltage signal, which depends on the vibration. The circuit element may measure a distance to the detection target object by obtaining a time difference between the transmitted ultrasonic wave and the received ultrasonic wave.

In the above ultrasonic sensor, the peripheral portion of the ultrasonic sensor is disposed orthogonal to the first surface, and is covered with the supplement oscillation portion of the acoustic matching member. Because of the above structure, when the ultrasonic wave is received with the oscillation surface of the acoustic matching member, the vibration created in response to the received ultrasonic wave is conducted to the first surface of the piezoelectric element via the conduction part and is also conducted to the periphery portion of the piezoelectric element via the supplement oscillation portion. The piezoelectric element oscillates in response to the vibration conducted to the peripheral portion in addition to the vibration conducted to the first surface. Specially, when the piezoelectric element 2 is compressed in a direction (also called "a principal direction") normal to the first surface due to the vibration conducted to the first surface, the piezoelectric element is stretched in a direction (also called "a supplement direction") perpendicular to the principal direction due to the vibration conducted to the peripheral portion. When the piezoelectric element is stretched in the principal direction due to the vibration conducted to the first surface, the piezoelectric element is compressed in the supplement direction due to the vibration conducted to the peripheral portion. In this way, the piezoelectric element has a stretch motion and a compression motion in the supplement direction so that a stretch motion and a compression motion in the principal direction are assisted.

Because of this, the magnitude of oscillation (i.e., an amount of deformation of the piezoelectric element) is increased as compared with a case where the vibration is conducted only from the first surface. Accordingly, level of the first voltage signal outputted form the piezoelectric element increases. As can be seen from the above, the above ultrasonic sensor can improve ultrasonic wave detection performance (e.g., reception sensitivity. Moreover, according to the above ultrasonic sensor, since the peripheral portion of the piezoelectric element is covered with the supplement oscillation portion of the acoustic matching member, it is possible to increase a bonding strength between the piezoelectric element and the acoustic matching member.

It should be noted that since the supplement oscillation portion covers the peripheral portion of the piezoelectric element, the supplement oscillation portion may have an effect on constraint of oscillation, which is caused by the received ultrasonic wave, of the piezoelectric element. Specifically, the supplement oscillation portion may constrain the oscillation (e.g., the compression motion, the stretch motion) of the piezoelectric element in the supplement direction, and as a result, may constrain the oscillation in the principal direction. Thus, in order to achieve the above-described advantage of improvement of detection performance, the effect on assistance of oscillation is made superior to the effect on constraint of oscillation. In view of this, the above ultrasonic sensor is configured such that the part of the supplement oscillation portion covering the piezoelectric element is less than or equal to the predetermined thickness threshold.

The effect of the supplement oscillation portion on the constraint of oscillation of the piezoelectric element is proportional to the mass of the piezoelectric element. The inventors of the present application have conducted experiments, simulations and the like, and have discovered that, when the mass of the supplement oscillation portion is less than or equivalent to the sum of the mass of the principal oscillation portion and the mass of the piezoelectric element, the above described advantage of improvement of he ultrasonic wave detection performance is achievable. In view of this, the above ultrasonic sensor may be configured in the following way. The predetermined thickness threshold is set so that mass of the supplement oscillation portion is less than or equal to a mass threshold, the mass threshold being obtained by a sum of mass of the principal oscillation portion and mass of the piezoelectric element. In this configuration, the above-described advantage of improvement of the ultrasonic wave detection performance is reliably and surely achievable.

The above ultrasonic sensor may be configured in the following way. The piezoelectric element further has a second surface located opposite to the first surface. The second surface of the piezoelectric element is covered with the supplement oscillation portion of the acoustic matching member. According to this configuration, when the ultrasonic wave is received with the oscillation surface of the acoustic matching member, the vibration created in response to the received ultrasonic wave is further conducted to the second surface of the piezoelectric element via the supplement oscillation portion. The piezoelectric element oscillates in the principal direction in response to the vibration conducted to the second surface in addition to the vibration conducted to the first surface. Accordingly, the oscillation of the piezoelectric element in the principal direction is further assisted. Therefore, as compared with a case where the vibration is conducted only from the first surface and the peripheral portion, it is possible to further increase the magnitude of oscillation, and further improve the ultrasonic wave detection performance.

The above ultrasonic sensor may be configured such that: the acoustic matching member and the piezoelectric element are bonded to each other by an adhesive material. In this configuration, the acoustic matching member and the piezoelectric element are not integral-molded but formed as different members provided separately from each other, and then the acoustic matching member and the piezoelectric element are bonded to each other by the adhesive material. In order to make the thicknesses of the part of the supplement oscillation portion, which part covers the piezoelectric element, less than or equal to the predetermined thickness threshold, i.e., in order to make the thickness of the part smaller to some extents, it may be necessary to set a molding pressure to a high value. However, the piezoelectric element has a given limit on withstanding pressure. Thus, if the acoustic matching member and the piezoelectric element are integral-molded, it may be necessary to set the molding pressure so as to satisfy (i) a first condition that the thickness of the supplement oscillation portion are less than or equal to the thickness threshold and (ii) a second condition that the molding pressure is less than or equal to the withstanding pressure of the piezoelectric element. In the above case, the setting of the molding pressure is quite complicated. In addition, depending on the above first and second condition, the manufacturing may becomes impossible. However, according to the above ultrasonic sensor, the molding pressure at the time of molding the acoustic matching member can be set so as to satisfy only the first condition. Therefore, the above ultrasonic sensor can advantageously facilitate the setting of the molding pressure.

The above ultrasonic sensor may be configured in the following way. The supplement oscillation portion of the acoustic matching member includes a first wall part, a second wall part, a third wall part and a fourth wall part. The first wall part, the second part, the third wall part and the fourth wall part of the supplement oscillation portion, together with the conduction part of the principal oscillation portion, define a space for insertion of the piezoelectric element. The piezoelectric element is located in the space. In this configuration, it is possible to cover the peripheral portion of the piezoelectric element with the supplement oscillation portion by only performing, in manufacturing steps, a process of inserting the piezoelectric element into the space defined in the supplement oscillation portion after manufacturing the acoustic matching member and the piezoelectric element separately from each other.

The above ultrasonic sensor may further include a signal line configured to conduct the first voltage signal, which is outputted from the piezoelectric element, to the circuit element. A groove for wiring may be formed on the supplement oscillation portion. The signal line may be wired through the groove. In this configuration, with the peripheral portion of the piezoelectric element being kept covered with the supplement oscillation portion, it is possible to wire the signal line through the groove of the supplement oscillation portion.

The above ultrasonic sensor may be configured in the following way. The piezoelectric element is configured to be operable as the transmitter for transmitting the ultrasonic wave. When the piezoelectric element operates as the transmitter, the circuit element outputs a second voltage signal, which controls the ultrasonic wave to be transmitted from the transmitter, to the piezoelectric element, and the oscillation surface of the acoustic matching member emits the ultrasonic wave produced by the piezoelectric element toward the detection target space. In this configuration, an additional transmitter for transmitting the ultrasonic wave may not be needed, and the ultrasonic sensor can be downsized as a whole.

The above ultrasonic sensor may be configured in the following way. The acoustic matching member is formed so that an area of the oscillation surface is larger than a cross-sectional area of a region of the conduction part, the region contacting the first surface of the piezoelectric element. In this configuration, the energy of the ultrasonic wave received with the oscillation surface is conducted via a region smaller in area than the oscillation surface. Therefore, it is possible to increase the energy per unit area and it is possible to improve efficiency in conduction of the ultrasonic wave.

The above ultrasonic sensor may be configured such that the acoustic matching member is made of polycarbonate resin. In the polycarbonate resin, a change in elasticity with temperature is small. As a result, a change in sound speed with temperature in the acoustic matching member is small, and the change in ultrasonic wave wavelength with temperature is small. Thus, it is possible to achieve an advantage of stable conduction of the vibration.

While the invention has been described above with reference to various embodiments thereof, it is to be understood that the invention is not limited to the above described embodiments and constructions. The invention is intended to cover various modifications and equivalent arrangements.

What is claimed is:

1. An ultrasonic sensor comprising:
a piezoelectric element configured to detect ultrasonic wave transmitted from a transmitter and reflected by a detection target object located in a detection target space;
an acoustic matching member
having an oscillations surface that is exposed to the detection target space to receive the ultrasonic wave reflected by the detection target object, and
configured to conduct the ultrasonic wave received with the oscillation surface to the piezoelectric element; and
a circuit element configured to perform processing on a voltage signal outputted from the piezoelectric element,
wherein:
the acoustic matching member includes:
a principal oscillation portion having the oscillations surface and a conduction part located opposite to each other, the conduction part being configured to conduct the ultrasonic wave received with the oscillation surface to the piezoelectric element; and
a supplement oscillation portion extending from the conduction part in a direction away from the oscillation surface;
the piezoelectric element has
a first surface facing and contacting the conduction part, and
a peripheral portion disposed orthogonal to the first surface;
the peripheral portion of the piezoelectric element is covered with the supplement oscillation portion of the acoustic matching member; and
thickness of a part of the supplement oscillation portion, the part covering the peripheral portion of the piezoelectric element, is smaller than a predetermined thickness of 1 mm.

2. The ultrasonic sensor according to claim 1, wherein:
the principal oscillation portion has an inverted tapered shape from the oscillation surface to the supplement oscillation portion; and
the ultrasonic sensor satisfies the following condition $$m2 \leq m1 + m3$$

where
$m2$ is a mass of the supplement oscillation portion,
$m1$ is a mass of the principal oscillation portion, and
$m3$ is a mass of the piezoelectric element.

* * * * *